(12) United States Patent
Simons

(10) Patent No.: US 11,734,640 B2
(45) Date of Patent: *Aug. 22, 2023

(54) METHOD AND SYSTEM FOR COLD CHAIN QUALITY CONTROL AND SECURITY

(71) Applicant: mPedigree Technologies B.V., Amsterdam (NL)

(72) Inventor: Bright Augustine Simons, Accra (GH)

(73) Assignee: mPedigree Technologies B.V., Amsterdam (NL)

( * ) Notice: Subject to any disclaimer, the term of this patent is extended or adjusted under 35 U.S.C. 154(b) by 0 days.

This patent is subject to a terminal disclaimer.

(21) Appl. No.: 17/677,741

(22) Filed: Feb. 22, 2022

(65) Prior Publication Data

US 2022/0180307 A1 Jun. 9, 2022

Related U.S. Application Data

(63) Continuation of application No. 16/026,026, filed on Jul. 2, 2018, now Pat. No. 11,295,265.

(51) Int. Cl.
*G06Q 10/08* (2023.01)
*G06Q 10/0832* (2023.01)
(Continued)

(52) U.S. Cl.
CPC ......... *G06Q 10/0832* (2013.01); *G01N 21/78* (2013.01); *G01N 31/229* (2013.01);
(Continued)

(58) Field of Classification Search
CPC ........... G06Q 10/0832; G06Q 10/0833; G01N 21/78; G01N 31/229
(Continued)

(56) References Cited

U.S. PATENT DOCUMENTS

| 6,009,400 A | 12/1999 | Blackman |
| 6,113,857 A | 9/2000 | Manico |

(Continued)

FOREIGN PATENT DOCUMENTS

| CN | 103592036 A | 2/2014 |
| CN | 103973757 A | 8/2014 |

(Continued)

OTHER PUBLICATIONS

Final Office Action dated Sep. 9, 2021, for U.S. Appl. No. 16/026,026, filed Jul. 2, 2018, 8 pages.

(Continued)

*Primary Examiner* — Ahshik Kim
(74) *Attorney, Agent, or Firm* — Morrison & Foerster LLP

(57) ABSTRACT

A cold chain system with thermosensitive labels linked to an online traceability portal is disclosed. The system includes a plurality of human a machine readable code labels having irreversible thermosensitive inks placed on various products. The labels optionally having multiple codes paired with various predefined discrete images or strings detected using optical methods or text-based transmission and communication protocols. The system can enhance cold chain quality and security by allowing real time validation and traceability from factory to end users through an online platform compatible with mobile devices. The system can also enhance both manual and technological cold chain security methods for countries that have varying degrees of technological capability to ultimately improve vulnerable supply chains.

20 Claims, 10 Drawing Sheets

(51) Int. Cl.

| | |
|---|---|
| *G01N 21/78* | (2006.01) |
| *G01N 31/22* | (2006.01) |
| *G06K 7/14* | (2006.01) |
| *G06K 19/06* | (2006.01) |
| *G06Q 10/0833* | (2023.01) |
| *G09F 3/00* | (2006.01) |
| *H04L 9/40* | (2022.01) |
| *H04W 4/12* | (2009.01) |
| *G06K 7/10* | (2006.01) |

(52) U.S. Cl.
CPC ..... *G06K 7/1417* (2013.01); *G06K 19/06037* (2013.01); *G06Q 10/0833* (2013.01); *G09F 3/0291* (2013.01); *G09F 3/0297* (2013.01); *H04L 63/102* (2013.01); *H04W 4/12* (2013.01); *G06K 2007/10524* (2013.01)

(58) Field of Classification Search
USPC .......................................................... 705/332
See application file for complete search history.

(56) References Cited

U.S. PATENT DOCUMENTS

| | | | |
|---|---|---|---|
| 6,865,516 | B1 | 3/2005 | Richardson |
| 7,791,984 | B2 | 9/2010 | Su et al. |
| 8,091,776 | B2 | 1/2012 | Nemet et al. |
| 8,500,014 | B2 | 8/2013 | Nemet et al. |
| 9,448,182 | B2 * | 9/2016 | Haarer ................... G01N 21/78 |
| 10,431,126 | B2 * | 10/2019 | Nicholson, Jr. ........ G01K 3/005 |
| 10,747,974 | B2 | 8/2020 | Ishida et al. |
| 10,859,546 | B2 | 12/2020 | Andersen et al. |
| 11,002,611 | B2 * | 5/2021 | Magen ................... G01K 11/12 |
| 11,295,265 | B2 | 4/2022 | Simons |
| 2004/0248305 | A1 | 12/2004 | Vaillant |
| 2008/0043804 | A1 | 2/2008 | Goldsmith et al. |
| 2018/0189621 | A1 | 7/2018 | Tokuda et al. |
| 2019/0316975 | A1 | 10/2019 | Tada et al. |
| 2019/0385115 | A1 | 12/2019 | Biermann et al. |
| 2020/0005237 | A1 | 1/2020 | Simons |
| 2020/0401990 | A1 | 12/2020 | Macdonald et al. |

FOREIGN PATENT DOCUMENTS

| | | |
|---|---|---|
| WO | 2016022607 A1 | 2/2016 |
| WO | 2020008373 A1 | 1/2020 |

OTHER PUBLICATIONS

International Preliminary Report and Patentability and Written Opinion dated Jan. 14, 2021, for PCT/IB2019/055653, filed Jul. 2, 2019, ten pages.

International Search Report and Written Opinion dated Nov. 11, 2019, for PCT/IB2019/055653, filed Jul. 2, 2019, seventeen pages.

Mohebi, Ehsan et al: (Oct. 30, 2014). "Intelligent packaging in meat industry: An overview of existing solutions", Journal of food science and technology, Springer (India) Private Ltd, India, vol. 52, No. 7, pp. 3947-3964, XP035505498, ISSN: 0022-1155, DOI: 10.1007/S13197-014-1588-Z. [retrieved on Oct. 30, 2014], the whole document.

Non-Final Office Action dated Mar. 30, 2021, for U.S. Appl. No. 16/026,026, filed Jul. 2, 2018, seven pages.

Notice of Allowance dated Nov. 29, 2021, for U.S. Appl. No. 16/026,026, filed Jul. 2, 2018, seven pages.

* cited by examiner

600A

| Code | Significance |
|---|---|
| 123456789 | No Breach |
| 12_45_78_ | Breach below first threshold temperature |
| 1_34_67_9 | Breach above second threshold temperature |
| 1__4__7__ | Breach below and above threshold temperatures |

600B

| Code | Significance |
|---|---|
| 445668902 | No Breach |
| _45668902 | Breach below first threshold temperature |
| 44566890_ | Breach above second threshold temperature |
| _4566890_ | Breach below and above threshold temperatures |

600C

| Code | Significance |
|---|---|
| 445668902 | No Breach |
| 44566890_ | Breach below first threshold temperature |
| 4456689_2 | Breach above second threshold temperature |
| 4456689__ | Breach below and above threshold temperatures |

FIG. 6

METHOD AND SYSTEM FOR COLD CHAIN QUALITY CONTROL AND SECURITY

CROSS-REFERENCE TO RELATED APPLICATION

This application claims priority to U.S. Non Provisional application Ser. No. 16/026,026, filed on Jul. 2, 2018, the contents of which is incorporated by reference herein in its entirety.

FIELD OF THE DISCLOSURE

This relates generally to cold chain quality control and security.

BACKGROUND OF THE DISCLOSURE

A cold chain is a temperature-controlled supply chain, which is the sequence of processes involved in the production and distribution of a commodity to an end customer. Cold chains are required for products that are not temperature stable (e.g., pharmaceutical products, produce, biologicals, seafood, and other perishable products) and are thus common in food, beverages, biotech, and pharmaceutical industries. Cold chains are also relevant for consumables whose taste or other characteristics are affected by temperature fluctuations, such as wine. For example, vaccines must be transported and stored at recommended temperatures from the time they are manufactured to the time they are administered for them to be effective. The appropriate temperature range for vaccines and other pharmaceutical products is product specific. For example, frozen vaccines (e.g., Varicella, MMRV, and Zoster) must be stored in a freezer between −50° C. and −15° C. (−58° F. and +5° F.). Most other vaccines can be stored between 2° C. to 8° C. (36° F. to 46° F.). This makes regular temperature monitoring essential for proper cold chain management because excess exposure to temperatures outside of appropriate temperature ranges can result in reduced vaccine potency or render the vaccines inactive—increasing the risk of preventable diseases. If these inactive vaccines are not detected, this can result in some patients believing they have been immunized when, in reality, they have not been. This is particularly problematic in developing nations and/or regions that have little or no cold chain infrastructure. Counterfeiting of pharmaceutical products, including vaccines, can also result in patients believing they are immunized against a particular disease when they are not. For example, in 1995, thousands of young Nigerians died from meningitis after receiving counterfeit meningitis vaccines that did not and could not protect them from the disease. Some systems attempt to monitor the temperature of vaccines vials with expensive sensors that are not scalable. Other systems use temperature-sensitive color indicators that require a human user (e.g., a nurse practitioner) to manually inspect the indicator, which can lead to false positives and/or false positives due to factors such as reactiveness of the temperature-sensitive color indicators, lighting conditions, and the quality of eyesight. Moreover, because the change/transition in the temperature-sensitive color indicators is static and known in advance, a malicious actor can easily replace the indicator the expected color indication or implement a color shift irrelevant to temperature. Therefore, an inexpensive and reliable system for cold chain quality control and security can be desirable.

SUMMARY OF THE DISCLOSURE

Examples of the disclosure are directed to a method and system for cold chain quality control and security. A system in accordance with embodiments of the present invention enables the cold chain of a perishable, delicate, or temperature-sensitive item to be preserved using inexpensive human and machine readable printed codes such as, but not limited to, alphanumerical identifiers, barcodes, and other patterns (e.g., color bands or bars) printed on one or more labels that are affixed to the product, product packaging, and/or shipment packaging. For example, the alphanumerical identifiers, barcodes, and/or any other patterns can be printed on the one or more labels with conventional inks and thermosensitive inks to detect a cold chain breach. In some examples, the unique code pairings (e.g., the alphanumerical identifiers, barcodes, and/or any other patterns with a product) are assigned during packaging. The thermosensitive inks can appear or disappear when exposed to temperature below a first threshold temperature and/or above a second threshold temperature. The first and second temperature thresholds can define the appropriate temperature range for storing the product (e.g., the recommended temperature range for storing vaccines). In some examples, the thermosensitive inks can appear or disappear when exposed to a first threshold temperature for a first threshold period of time and/or above a second threshold temperature for a second threshold period of time. In some examples, the first threshold period of time can be different or the same as the second period of time. The alphanumerical identifiers, barcodes, and/or any other patterns printed on the one or more labels can be unique to the product they are affixed on and can be stored on a server. The alphanumeric characters and/or sections of the barcode printed with the thermosensitive inks that appear or disappear when exposed to temperatures below a first threshold temperature (e.g., −50° C., 2° C.) and/or above a second threshold temperature (e.g., −15° C., 8° C.) can create different predetermined alphanumeric identifiers and/or barcode combinations that can be used by the system to detect a cold chain breach (e.g., exposure to temperatures outside of the recommended range for that particular product). In some examples, the thermosensitive inks can change color from a first color (e.g., black) to a second color when exposed to temperatures below a first threshold temperature (e.g., −50° C., 2° C.) and/or from the first color to a third color when exposed to temperatures above a second threshold temperature (e.g., −15° C., 8° C.)—providing a visual indication of when a cold chain breach occurred (e.g., when a temperature threshold is exceeded). In some examples, the color changes will only occur if the inks are exposed to certain temperatures for over a threshold period of time. In some examples, the labels can be verified by visually inspecting the label (e.g., by inspecting the color of the alphanumeric identifier, barcode, and/or other printed pattern), taking a picture of the label, and/or scanning the label (e.g., with an infrared scanner, a camera, or a smart phone) by different actors/entities along a cold chain and logged on a server or other computing device—allowing the system to easily and automatically determine where along the cold chain a breach occurred. In some examples, an end user can verify a product (e.g., ensure that no cold chain breach occurred and/or validate its authenticity) by scanning the label (e.g., with an infrared scanner, a camera, or a smart phone), taking a picture of the label (e.g., with a cell phone, camera, or any other device with a camera), visually inspecting the label (e.g., by inspecting the color of the alphanumeric identifier and/or barcode as directed by instructions contained with the vaccine), and/or communicating the label information to an online system for verification. For example, the alphanumeric indicator can be communicated to the online system via a text-based communication protocol (e.g., GSM Short Messaging Service (SMS)) that automatically responds with an indication of whether the product is verified or not (e.g., is counterfeit, has been tampered with, and/or has been recalled). In some examples, a label signature pattern (e.g., a color bar and/or band pattern) can be paired with the label (e.g., to the identifier or barcode) for additional label anti-tampering security. For example, a receiving entity of a cold chain (e.g., a pharmacy or end user) would be able to ensure that the label was not tampered with (e.g., replaced) by matching the label signature pattern on the product with the expected pattern (e.g., according to vendor instructions). In some examples, the signature pattern can be placed on, over, or adjacent to product SKUs, barcodes, item model numbers, or any other labels on the product (e.g., other barcodes). In this way, the system can ensure that no cold chain breach occurred, the product was not tampered with, the product is authentic, and/or the product is safe to use.

BRIEF DESCRIPTION OF THE DRAWINGS

FIG. 6 illustrates codes according to examples of the disclosure.

DETAILED DESCRIPTION

In the following description of examples, references are made to the accompanying drawings that form a part hereof, and in which it is shown by way of illustration specific examples that can be practiced. It is to be understood that other examples can be used and structural changes can be made without departing from the scope of the disclosed examples.

Figure 1:
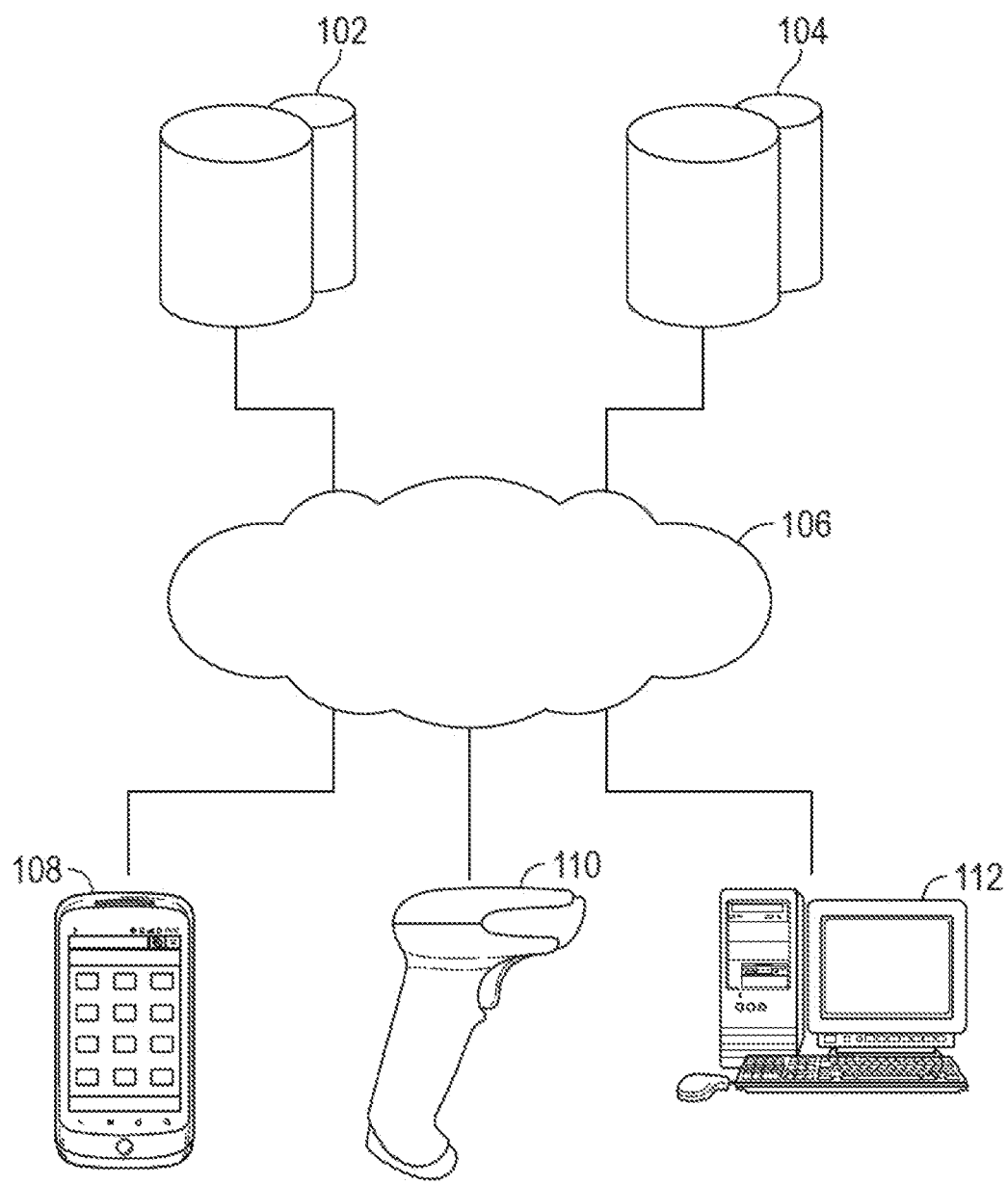
FIG. 1 illustrates cold chain management system according to examples of the disclosure.

FIG. 1 illustrates a cold chain management system 100 according to examples of the disclosure. As illustrated, system 100 can include server and/or database 102 for storing product codes (e.g., alphanumeric codes, barcodes, and/or other patterns) and information about the product(s) to which they are paired (e.g., as described with reference to FIGS. 2-8 below). In some examples, server 102 can store information about whether a product is authentic, whether there has been a recall, and/or whether a breach occurred. In some examples, server 102 can perform any of the processes described below. For example, server 102 can receive a request to verify an alphanumeric code and/or bar code and return an indication of whether there was a cold chain breach associated with that product and/or whether the product is authentic (e.g., as described below with reference to FIGS.

7-8). The system 100 can also include server and/or database 104 for storing log information from product scans performed along a cold chain. For example, server 104 can store the alphanumeric identifier, barcode, and/or other pattern (e.g., color band or bars) scanned by an entity along the cold chain (e.g., the manufacturer, upstream actors, midstream actors, downstream actors, end user, etc.) with an identifier of the scanning entity (e.g., entity ID, employee ID, or any other identifier of the entity/person handling the product); the date and time of the scan; one or more characteristics of the one or more labels containing the alphanumeric identifier, barcode, and/or other pattern (e.g., alphanumeric character sequence, the condition of the label, the color of the label and/or the ink on the label, a picture of the label); and/or any other additional information about the product and/or other labels (e.g., product SKU, model code/number, and/or product signature). In some examples, servers 102 and 104 can be the same server or be different servers. In some examples, servers 102 and 104 can communicate with each other via network 106 (e.g., the Internet).

System 100 can also include other multifunction devices such as cell phones 108, scanners 110 (e.g., infrared scanners, barcode scanners, or any device with a camera), and computers 112 that can be in communication with each other and/or servers 102 and/or 104, as shown in FIG. 1. In some examples, cell phones 108 can be a simple cell phone or a smart phone. Cell phones 108 and scanners 110 can be used to scan the alphanumeric identifiers and/or barcodes on a product (e.g., as described below with reference to FIGS. 2-8) and communicate the scanned information to servers 102 (e.g., for verification) and/or 104 (e.g., for logging) through network 106. In some examples, cell phones 108 can communicate with servers 102 and/or 104 through an application installed on cell phones 108 or through a website or online portal hosted on servers 102 and/or 104. In some examples, scanners 110 can communicate with servers 102 and/or 104 via computers 112 (e.g., as described below with reference to FIG. 3). In some examples, computers 112 can communicate with servers 102 and/or 104 via network 106 for product verification and/or viewing cold chain log data. In some examples, servers 102 and/or 104 can communicate with cellphones 108, scanners 110, and/or computers 112 via network 106.

In some examples, servers 102 and/or 104 can be linked to other external networks such as the Center for Disease Control, the Department of Homeland Security, and/or the FDA. In this way, servers 102 and/or 104 can receive real-time product information updates. For example, servers 102 and/or 104 can receive notifications about product recalls, security FDA updates regarding a drug status, and/or the need for emergency supplies of a particular product (e.g., the need for vaccines during an epidemic). Servers 102 and/or 104 can then communicate this information to cold chain actors (e.g., to devices associated with those entities), who can then be prompted to pull/discard products and/or manufacture additional products.

In some examples, each of cell phones 108, scanners 110, computers 112, server 102 and server 104 can include one or more processors and a non-transitory computer readable storage medium. The non-transitory computer readable storage medium can store one or more programs comprising instructions (e.g., any of the methods described herein) that can be executed by the one or more processors of each of cell phones 108, scanners 110, computers 112, server 102 and server 104.

Figure 2:
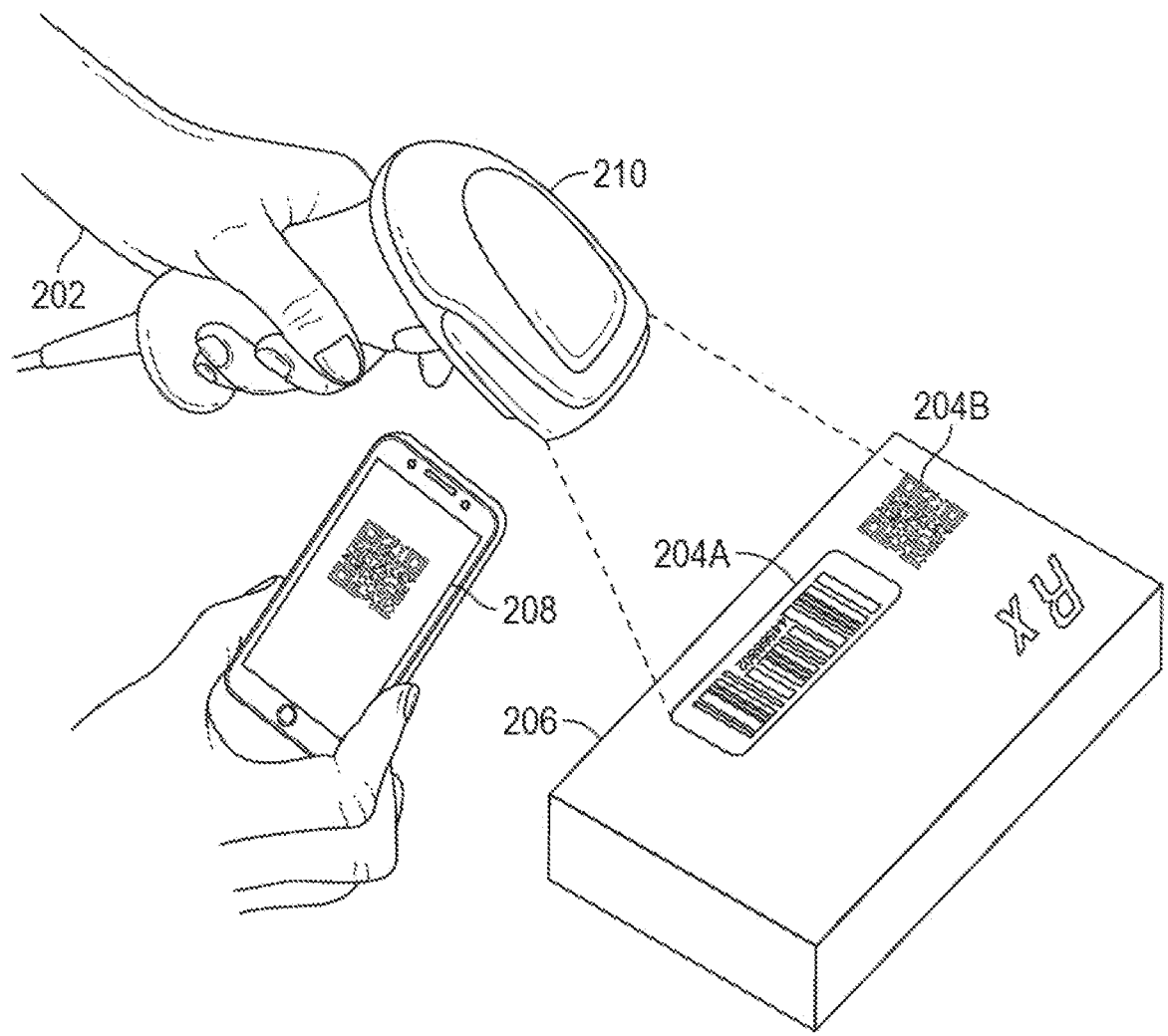
FIG. 2 illustrates a user scanning labels according to examples of the disclosure.

FIG. 2 illustrates user 202 scanning labels 204A and/or 204B on product 206 according to examples of the disclosure. For example, user 202 can use handheld scanner 210 to scan one or more barcodes (e.g., Code 128, Code 39, QR Code, PDF417 Code, UPC Code, Codebar, or Code 93 codes) or any other pattern printed on labels 204A and/or 204B. Handheld scanner 210 can use lasers, lights, sensors, or cameras to read the codes printed on labels 204A and/or 204B. In some examples, scanner 210 can communicate the scanned information to a server (e.g., servers 102 and/or 104 as described above with reference to FIG. 1). In some examples, user 202 can use cell phone 208 (or any other device with a camera) to scan the codes or other patterns printed on labels 204A and/or 204B and communicate the scanned information to a server (e.g., servers 102 and/or 104 as described above with reference to FIG. 1). The scanned information (e.g., captured by handled scanner 210 or cell phone 208) can optionally include an alphanumeric indicator printed on labels 204A and/or 204B, an alphanumeric representation of the barcode(s) or pattern printed on labels 204A and/or 204B, a picture of labels 204A and/or 204B, the date and/or time of the scan, or an identifier (ID) of the scanning party (e.g., employee ID, entity ID, device ID). In some embodiments, the server (e.g., servers 102 and/or 104 as described above with reference to FIG. 1) can return an indication of whether the product is verified (e.g., no cold chain breach has occurred) or not verified (e.g., a cold chain breach occurred, the product is being recalled, is counterfeit, or has been tampered with). In some examples, this indication can be communicated (e.g., via a text message, phone call, email, and/or any instant messaging service) to the scanning party and/or some or all of the entities involved in the cold chain (e.g., the manufacturer, upstream actors, midstream actors, and/or downstream actors). In some embodiments, the indication will include instruction on what to do with a product when a cold chain breach is detected, when labels 204A and/or 204B have been tampered with, and/or when it is determined that the product is counterfeit (e.g., discard the product or return the product to the manufacturer or some other entity).

It should be understand that while FIG. 2 illustrates labels 204A and 204B affixed on product 206, labels 2204A and/or 204B (or any other label mentioned herein) can be additionally or alternatively affixed to product packaging and/or shipment packaging. In this way, individual products do not need to be scanned at each point of the cold chain. Additionally, product 206 can be one or more pharmaceutical products (e.g., vaccines or other medicines), produce, seafood, or any other perishable products that are not temperature stable.

Figure 3:
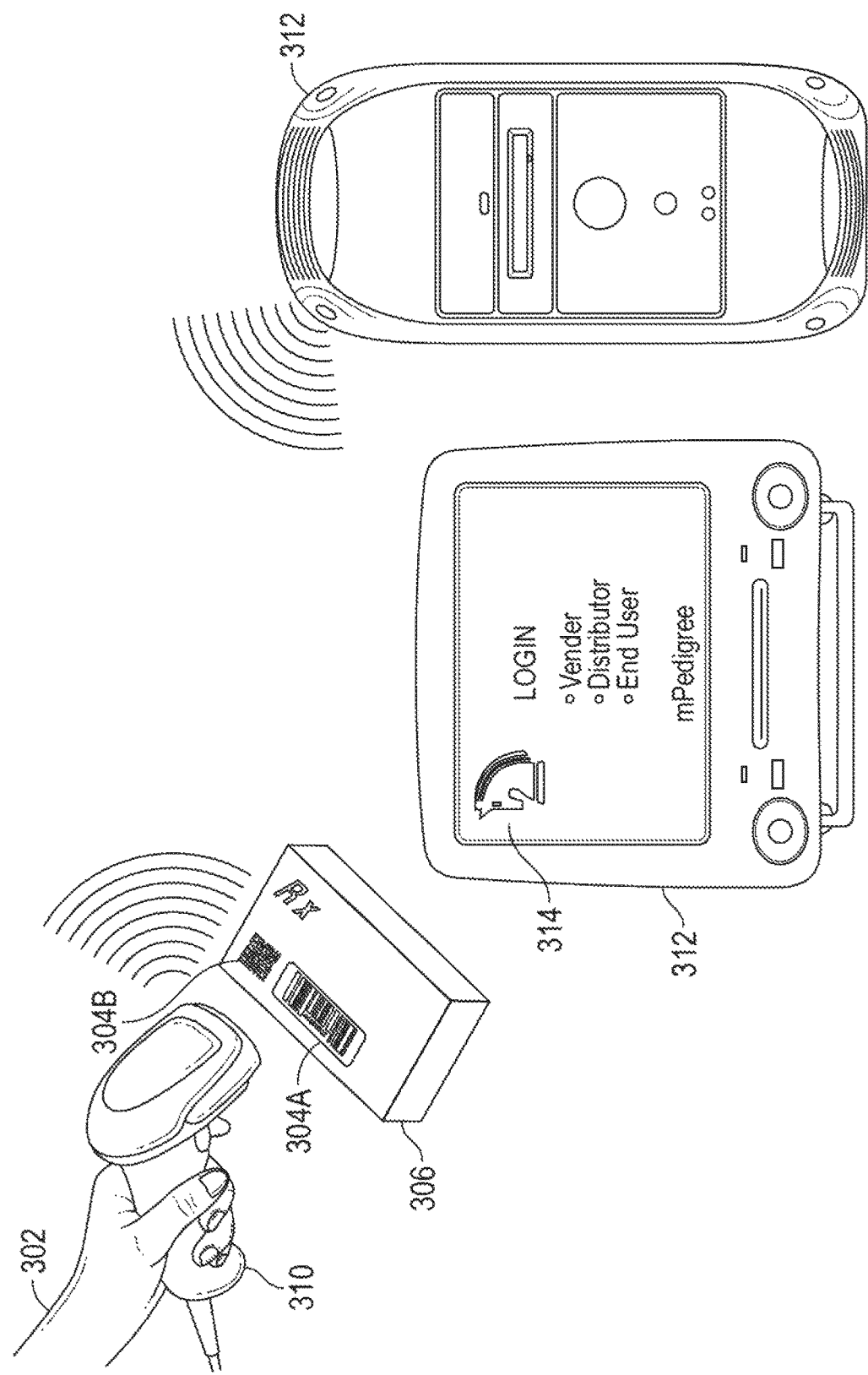
FIG. 3 illustrates a user scanning labels according to examples of the disclosure.

FIG. 3 illustrates user 302 using handheld scanner 310 to scan labels 304A and/or 304B on product 306 according to examples of the disclosure. In some examples, scanner 310 can communicate scanned information to a computer 312, which can in turn communicate the scanned information to a server (e.g., servers 102 and/or 104 as described above with reference to FIG. 1). In some examples, scanner 310 can communicate with computer 312 wirelessly (e.g., through WiFi, Bluetooth™, and/or radio channels). The scanned information captured by scanner 310 and communicated to computer 312 and/or a server optionally include an alphanumeric indicator printed on labels 304A and/or 304B, an alphanumeric representation of the barcode(s) or pattern printed on labels 304A and/or 304B, a picture of labels 304A and/or 304B, the date and/or time of the scan, or an identifier (ID) of the scanning party (e.g., employee ID, entity ID, scanner ID, MAC address). In some embodiments, the server (e.g., servers 102 and/or 104 as described above with reference to FIG. 1) can return an indication to computer 312 of whether the product is verified (e.g., no cold chain breach has occurred), not verified (e.g., a cold chain breach occurred), or counterfeit. In some examples, computer 312 can communicate with the server via an application, website, and/or online portal 314 hosted on the server. In some examples, the indication can be communicated (e.g., via a text message, phone call, email, and/or any other instant messaging service) to the scanning party and/or some or all of the entities involved in the cold chain (e.g., the manufacturer, upstream actors, midstream actors, and/or downstream actors). In some embodiments, the indication will include instructions on what to do with a product when a cold chain breach is detected, when labels 204A and/or 204B have been tampered with, and/or when it is determined that the product is counterfeit (e.g., instructions on how to discard the product, return the product to the manufacturer or some other entity, test the product). In some embodiments, a user can access cold chain data (e.g., scanned information from the server (e.g., servers 102 and/or 104 as described above with reference to FIG. 1) from an application, website, and/or online portal 314 hosted on the server via computer 312. In this way, the server can provide comprehensive product traceability access (e.g., through a cloud-based internet platform) to all stakeholders, including, but not limited to, manufacturers, distributors, merchants, end users, governing entities, regulation entities, etc. This real-time access to complete validation and tracking history of product along with any cold chain breach information can allow stakeholders to take appropriate measures.

Figure 4:
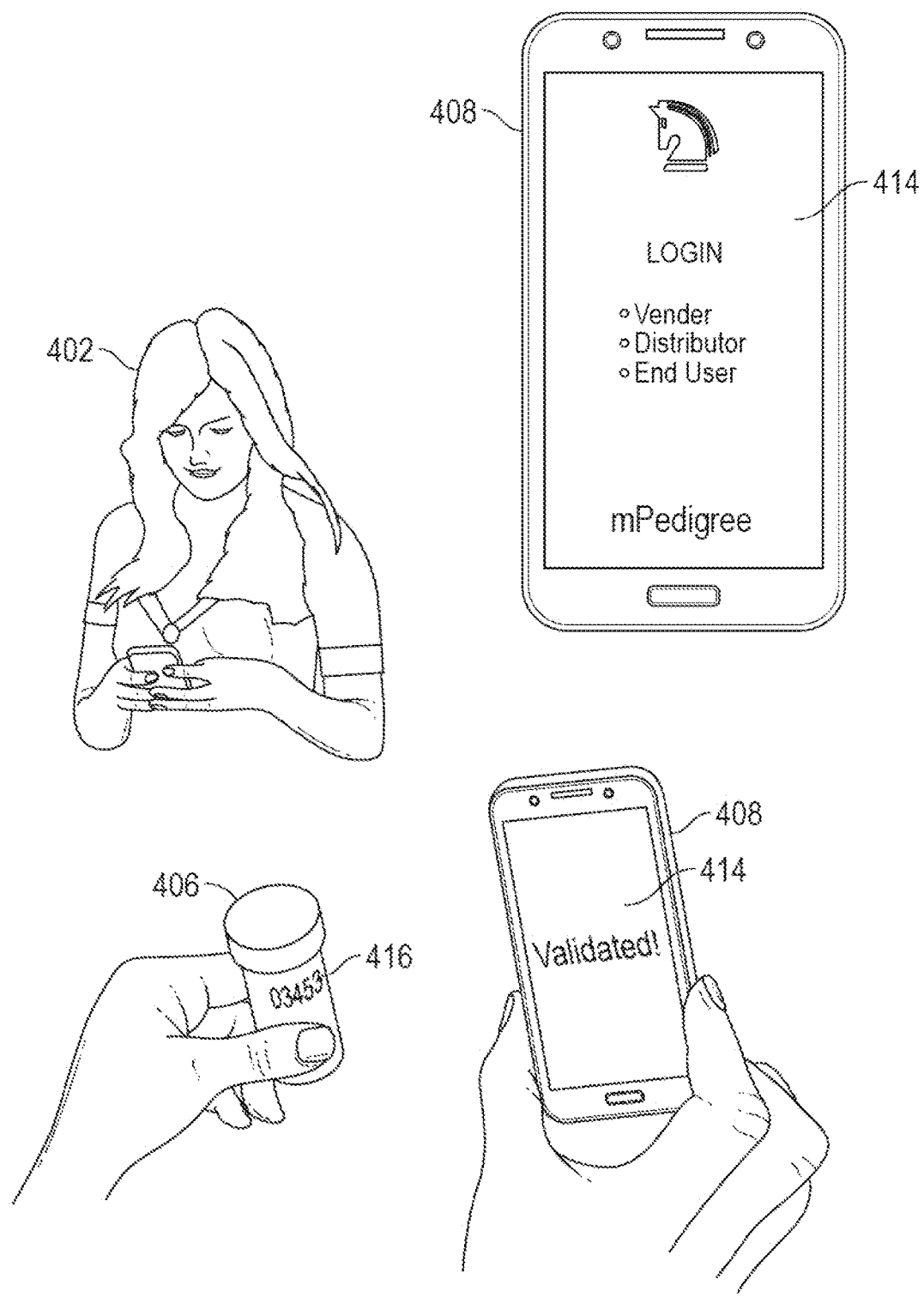
FIG. 4 illustrates a user validating an alphanumeric code according to examples of the disclosure.

FIG. 4 illustrates a user 402 validating an alphanumeric code 416 on a cell phone 408 according to examples of the disclosure. In some examples, user 402 can validate the alphanumeric code 416 affixed on product 406 through an application, website, and/or online portal 414 via cell phone 408, as shown in FIG. 4. For example, user 402 can enter the alphanumeric code 416 on product 406 into application, website, and/or online portal 414, as well as submit a validation request to a server (e.g., servers 102 and/or 104 as described above with reference to FIG. 1) (e.g., as described below with reference to FIGS. 7-8). In some examples, user 402 can verify an alphanumeric code 416 via a text-based communication protocol (e.g., GSM Short Messaging Service (SMS)) by sending a text with the code to a number (e.g., a toll-free number) that is associated with the server, which responds with an indication of whether the product is verified (e.g., no cold chain breach has occurred), not verified (e.g., a cold chain breach occurred, the product has been tampered with, the product is counterfeit, and/or the product has been recalled). In some examples, the alphanumeric code 416 (or any alphanumeric identifier described in the disclosure) can comprise more than one row of characters.

Figure 5A:
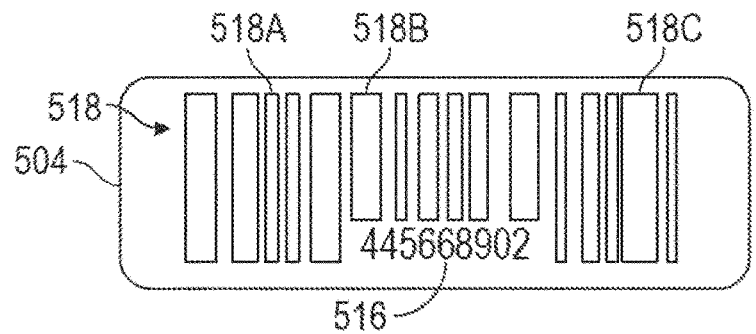
FIGS. 5A-5G illustrate labels according to examples of the disclosure.

FIGS. 5A-5G illustrate product labels according to examples of the disclosure. FIG. 5A illustrates label 504 with barcode 518 and alphanumeric identifier 516 printed on it. In some examples, barcode 518 and alphanumeric identifier 516 can be unique to a particular product (e.g., the product that the label is ultimately affixed to), and this product and label pairing can be stored on a server or database (e.g., servers 102 and/or 104 as described above with reference to FIG. 1). In some examples, barcode 518 can be any of Code 128, Code 39, QR Code, PDF417 Code, UPC Code, Codebar, Code 93, or any other barcode. In some examples, a portion (or quadrant) of barcode 519 and/or alphanumeric identifier 516 can be printed on a label with conventional inks, and another portion (or quadrant) can be printed with reversible and/or irreversible thermosensitive inks to detect a cold chain breach. The thermosensitive inks can appear or disappear when exposed to temperature below a first threshold temperature (e.g., 2° C.) and/or above a second threshold temperature (e.g., 8° C.), creating different barcode and alphanumeric identifier combinations when those thresholds are exceeded. In some examples, the possible barcode and alphanumeric identifier combinations are stored on a server with their significance (e.g., as described below with reference to FIG. 6). For example, bars 518A, 518B, and 518C can be printed with one or more thermosensitive inks (e.g., each of bars 518A, 518B, and 518C can be printed with the same or different thermosensitive ink), while the other bars of barcode 518 can be printed with conventional ink (e.g., non-thermosensitive ink). When portions of barcode 518 are printed with different thermosensitive inks, barcode 518 can indicate when the label is exposed to temperatures below a first threshold using a first thermosensitive ink for at least one bar (e.g., bar 518A) that permanently or temporarily appears or disappears when exposed to temperatures below that first temperature threshold and/or can indicate when the label is exposed to temperatures above a second threshold using a second thermosensitive ink for at least one bar (e.g., bar 518B) that permanently or temporarily appears when exposed to temperatures above that second temperature threshold. In some examples, the thermosensitive ink appears or disappears when exposed to temperatures beyond one or more temperature thresholds for one or more time thresholds. For example, barcode 518 as shown in FIG. 518A can indicate that that no cold breach has occurred, barcode 518 with bar 518A missing (e.g., disappeared) can indicate that the product was exposed to temperatures below a first temperature threshold, barcode 518 with bar 518B missing (e.g., disappeared) can indicate that the product was exposed to temperatures above a second temperature threshold, and a barcode with bars 518A and 518B missing (e.g., disappeared) can indicate that the product was exposed to temperatures below a first temperature threshold (e.g., for a first time threshold) and above a second temperature threshold (e.g., for a second time threshold). In some examples, a portion or one or more bars in a barcode (e.g., a quadrant) can be printed with thermosensitive ink. For example, bar 518C in FIG. 5A can be printed with one or more thermosensitive inks such that a vertical or horizontal segment (or any portion, quadrant, or pattern) of bar 518C will disappear if exposed to a temperature below a first threshold temperature (e.g., increasing the distance between bar 518C and the adjacent bar of barcode 518 to create a different predetermined barcode combination). Additionally or alternatively, a different vertical or horizontal segment (or any portion, quadrant, or pattern) of bar 518C can be printed with a different thermosensitive ink that will disappear if exposed to a temperature above a second threshold temperature (e.g., increasing the distance between bar 518C and the adjacent bar of barcode 518 to create a different predetermined barcode combination). In some examples, a first segment of a bar or barcode can be printed with a first thermosensitive ink that disappears when exposed to temperatures beyond a first temperature threshold for at least a first time threshold and another segment of a bar or barcode can be printed with a second thermosensitive ink that disappears when exposed to temperatures beyond a first temperature threshold for at least a second time threshold, longer than the first time threshold. In this way, the system can determine how long the product was exposed to temperatures beyond the first temperature. As discussed above, these possible barcode combinations of the same barcode label can be stored on a server with their significance such that a system in accordance with the invention can automatically detect a cold chain breach without requiring a user to manually try to decipher a machine-readable barcode to detect a pattern corresponding to a cold chain breach.

Figure 5B:
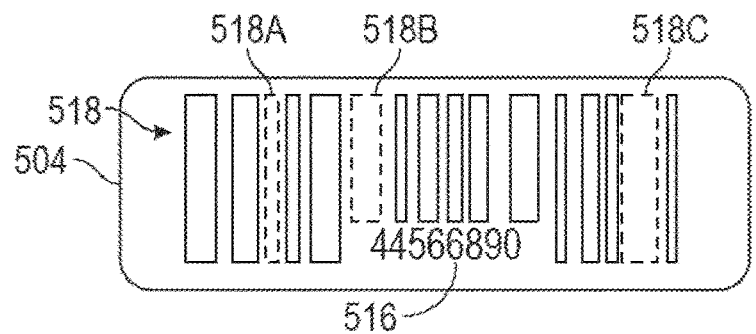

FIG. 5B illustrates exemplary label 504 after being exposed to temperatures that caused bars 518A 5A, 518B, and 518C to disappear because the label was exposed to temperatures below a first temperature threshold and/or above a second temperature threshold. In some examples, the visible bars shown in FIG. 5A can convey a different alphanumeric representation of barcode 518 in FIG. 5A than the alphanumeric representation of barcode 518 shown in FIG. 5B. The alphanumeric representation of barcode 518 in FIG. 5A and its corresponding significance (e.g., that no cold chain breach occurred) and the alphanumeric representation of barcode 518 in FIG. 5B (or any cold chain breach combination described above) and its corresponding significance (e.g., that a cold chain breach occurred) can be stored on a server (e.g., servers 102 and/or 104 as described above with reference to FIG. 1). In this way, the server can return (e.g., to a scanner, cell phone, and/or computer) an indication (e.g., an alert, text message, phone call, email, and/or any instant messaging service) that a cold chain breach has not occurred when the label shown in FIG. 5A is scanned and return an indication that a cold chain breach did occur when the label shown in FIG. 5B is scanned or vice versa when thermosensitive inks are used that appear (instead of disappear) when exposed to temperatures beyond threshold temperatures. In this way, a system in accordance with the invention can automatically detect a cold chain breach without requiring a user to manually try to decipher the label.

Figure 5C:
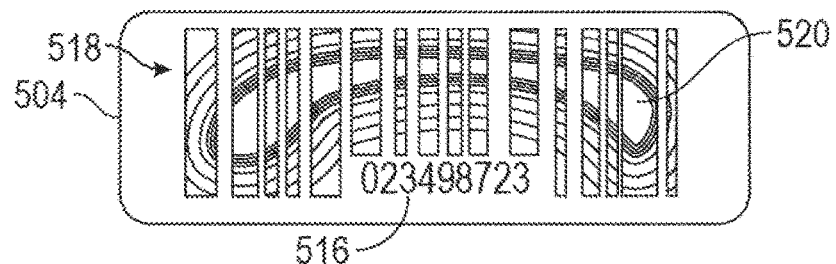

In some examples, the thermosensitive inks can permanently or temporarily change color from a first color (e.g., black) to a second color when exposed to temperatures below a first threshold temperature (e.g., 2° C.) and/or from the first color to a third color when exposed to temperatures above a second threshold temperature (e.g., 8° C.)—providing a visual indication of when a cold chain breach occurs (e.g., when a temperature threshold is exceeded). In some examples, the second color can be the same or different from the third color. In some examples, the thermosensitive ink changes color only when exposed to temperatures beyond one or more temperature thresholds for at least one or more time thresholds. In some examples, the thermosensitive ink can dynamically evolve into distinct pattern based on its "memory" of temperature gradients. By combining different thermosensitive inks with different thermo-receptor behaviors and responses together with conventional inks, patterns can be formed that alter in design as the temperature changes, producing effects that an optical scanner or normal text-input device can detect and communicate to a server to extract information about the temperature conditions the label was exposed to before and/or at the time of the reading (e.g., as shown in FIGS. 5C and/or 5G). For example, the pattern 520 shown in FIG. 5C can represent that a cold chain breach occurred.

In other examples, a pattern or signature can printed on a label to ensure that the label has not been tampered with. For example, in some embodiments, pattern 520 shown in FIG. 5C can represent a signature specific to that label/product that can be detected by a scanner, cell phone, and/or any other device with a camera and was communicated with a server that can return an indication of whether the pattern/signature matches the product (e.g., matches the barcode, SKU numbers, item model numbers, or any other labels on the product). In other examples, the signature can be a band/bar pattern (e.g., a pattern of different sized and/or colored bars and/or bands) (e.g., as shown in FIG. 5G). If the pattern/signature does not match the product (e.g., as registered with the server), an indication that the label has been tampered with is returned. In some examples, the pattern/signature will only become visible when exposed to a light wave on a specific spectrum (e.g., UV or light activated patterns). For example, the pattern/signature can become visible when exposed to a camera flash.

Figure 5D:
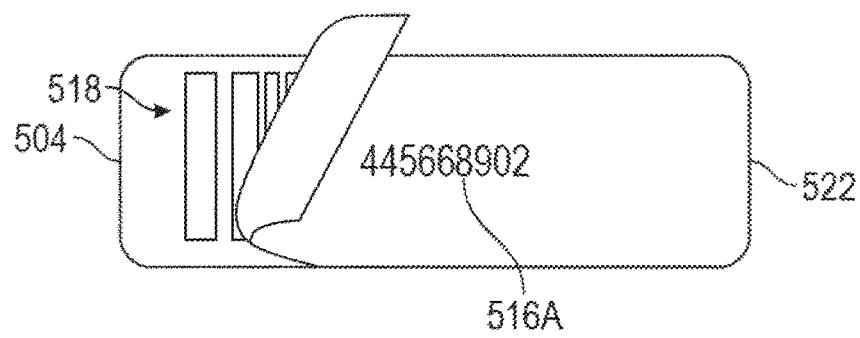

FIG. 5D illustrates label 504 with peel-back tab 522 removably affixed to it with a light adhesive. This allows barcode 518 to remain hidden until tab 522 is peeled back. In some examples, peel-back tab 522 can have a human readable alphanumeric identifier 516A printed with conventional inks and/or one or more thermosensitive inks. In some examples, the alphanumeric identifier 516A printed on peel-back tab 522 is the same or different than any alphanumeric identifier printed on label 504. In some examples, the barcode and alphanumeric identifier described above with reference to FIGS. 5A-5B can be printed on peel-back tab 522 of FIG. 5D and the barcode and alphanumeric identifier described above with reference to FIG. 5C can be printed on label 504 of FIG. 5D. In some examples, the barcode and alphanumeric identifier described above with reference to FIG. 5C can be printed on peel-back tab 522 of FIG. 5D and the barcode and alphanumeric identifier described above with reference to FIGS. 5A-5B can be printed on label 504 of FIG. 5D.

Figure 5E:
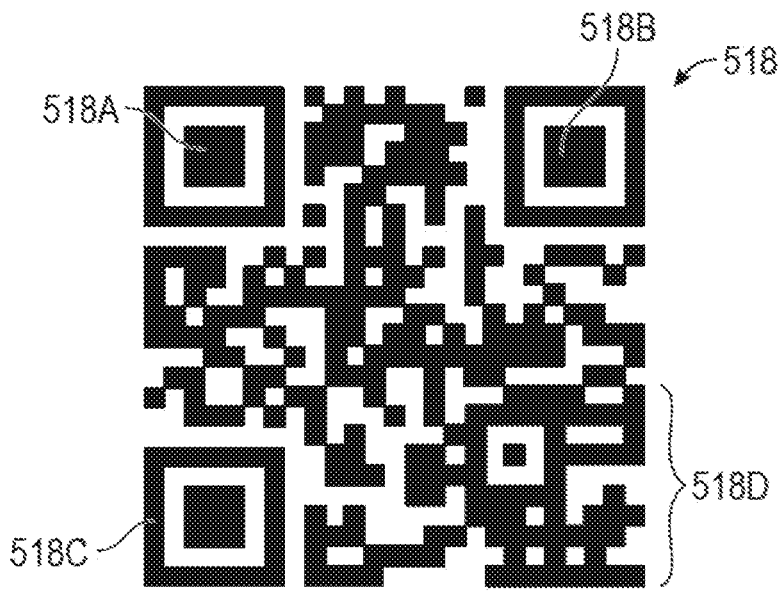
Figure 5F:
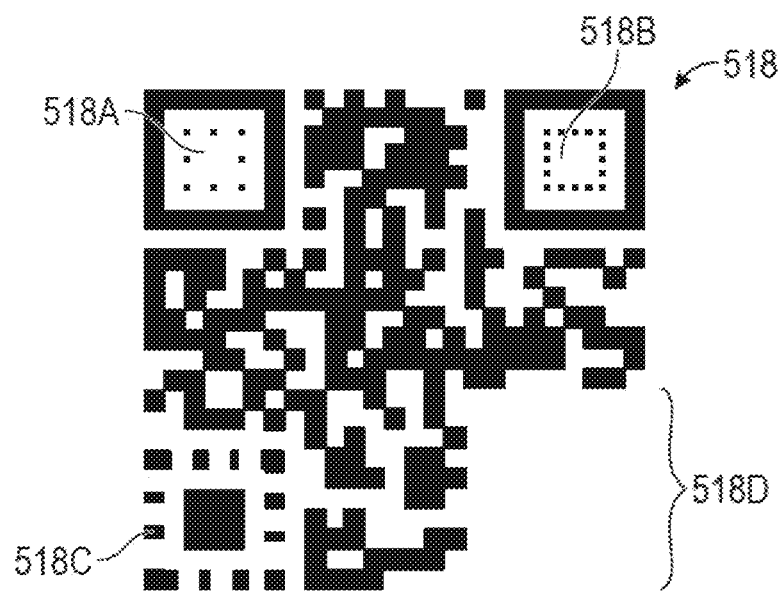
Figure 5G:
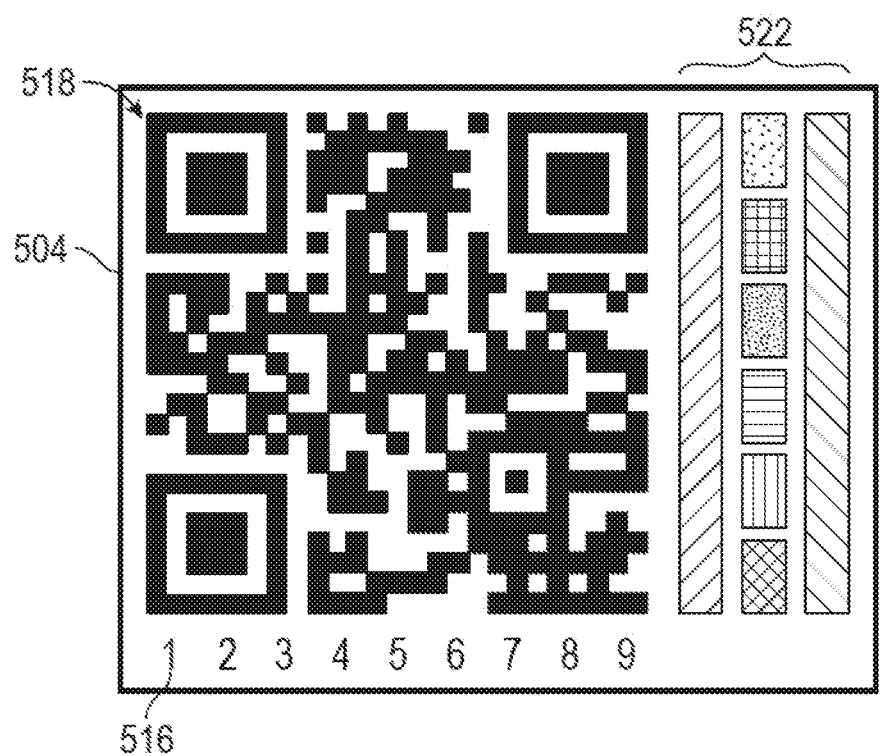

In some examples, two-dimensional (2D) barcodes can be used. FIG. 5E illustrates 2D barcode 518 printed with conventional inks in certain portions (or quadrants) and with reversible and/or irreversible thermosensitive inks in other portions (or quadrants) to detect a cold chain breach. The thermosensitive inks can appear or disappear when exposed to temperature below a first threshold temperature (e.g., 2° C.) (e.g., for a first period of time) and/or above a second threshold temperature (e.g., 8° C.) (e.g., for a second period of time), altering 2D barcode 518 when those thresholds are exceeded. For example, portions 518A-518D of barcode 518 can be printed with thermosensitive ink(s) and the other portions can be printed with conventional ink(s). The portions 518A-518D of barcode 518 printed with thermosensitive inks can appear or disappear when exposed to temperature below a first threshold temperature (e.g., 2° C.) (e.g., for a first period of time) and/or above a second threshold temperature (e.g., 8° C.) (e.g., for a second period of time) (e.g., as described above with reference to FIGS. 5A-5B). For example, FIG. 5F illustrates 2D barcode 518 after being exposed to temperatures that caused portions 518A, 518B, 518C, and 518D to disappear because the label was exposed to temperatures below a first temperature threshold (e.g., for a first period of time) and/or above a second temperature threshold (e.g., for a second period of time)—indicating a cold chain breach (e.g., as described above with reference to FIGS. 5A-5B). In some examples, a cold chain breach can be detected using barcode error correction techniques (e.g., Reed-Solomon or error correction techniques). For example, 2D barcode 518 shown in FIG. 5F can be read using error correction techniques by reconstructing missing portions 518A, 518B, 518C, and 518D of 2D barcode 518 (which had been printed with thermosensitive ink(s)), and, by so doing, measure the apparent "damage" done to the 2D barcode as a result of temperature changes. If a certain amount of "damage" is detected, the system (e.g., the device scanning the barcode, a computer, and/or a server) can determine that a cold chain breach occurred.

In some examples, other patterns can be printed on a label. For example, a bar or band pattern 522 can be printed on label 504 as shown in FIG. 5G. In some examples, band pattern 522 can be printed with conventional inks in certain portions (or quadrants) and with reversible and/or irreversible thermosensitive inks in other portions (or quadrants) to detect a cold chain breach. In some examples, the entire band pattern can be printed with one or more reversible and/or irreversible thermosensitive inks (e.g., with each having a different temperature threshold). In some examples, the thermosensitive inks can permanently or temporarily change color from a first color (e.g., black) to a second color when exposed to temperatures below a first threshold temperature (e.g., 2° C.) and/or from the first color to a third color when exposed to temperatures above a second threshold temperature (e.g., 8° C.)—providing a visual indication of when a cold chain breach occurs (e.g., when a temperature threshold is exceeded). In some examples, the second color can be the same or different from the third color. In some examples, the thermosensitive ink changes color only when exposed to temperatures beyond one or more temperature thresholds for at least one or more time thresholds. In some examples, band pattern 522 and barcode 518 and/or alphanumeric identifier 516 are scanned by a device (e.g., a scanner or any device with camera) and communicated to a server that responds with an indication of whether the combination of the band pattern 522 and barcode 518 and/or alphanumeric identifier 516 corresponds to a cold chain breach (e.g., without requiring a user to manually analyze the band pattern). In some examples, a temperature/color legend can be printed on the label or included in instructions with the product to help determine whether a cold chain breach occurred. In some examples, band pattern can two or more color patterns, as shown in FIG. 5G, and each of these colors can change when a different temperature threshold is exceeded. In some examples, the thermosensitive ink can dynamically evolve into a distinct pattern based on its "memory" of temperature gradients. By combining different thermosensitive inks with different thermo-receptor behaviors and responses together with conventional inks, patterns can alter in appearance as the temperature changes, producing effects that an optical scanner or normal text-input device can detect and communicate to a server to extract information about the temperature conditions the label was exposed to before and/or at the time of the reading. For example, the band pattern 522 shown in FIG. 5G can indicate that a cold chain breach occurred. In some examples, band pattern 522 can be printed on label 504 with a barcode 518 and/or alphanumeric identifier 516 as shown in FIG. 5G. In some examples, barcode 518 can be any of 1D or 2D barcode (e.g., Code 128, Code 39, QR Code, PDF417 Code, UPC Code, Codebar, or Code 93 codes). In some examples, band pattern 522 is printed on a separate label from barcode 518 and/or alphanumeric identifier 516.

FIG. 6 illustrates codes and their significance according to examples of the disclosure. In some examples, codes 616A-616C in FIG. 6 can represent the alphanumeric identifiers described above with reference to FIGS. 1-5. While codes 616A-616C show numerical combinations, it should be understood that they can also include letters, shapes, and/or symbols. As described above, one or more characters of codes 616A-616C can be printed with the thermosensitive ink(s) that appear or disappear when exposed to temperatures below a first threshold and/or above a second threshold to create different predetermined code combinations that can be used by the system to detect a cold chain breach (e.g., exposure to temperatures outside of the recommended range for that particular product). For example, certain characters in codes 616A-616C can be printed with a thermosensitive ink that disappears when exposed to temperatures below a first threshold value (e.g., 2° C.), as shown in rows 604A, 608A, 604B, 608B, 604C, and 608C of FIG. 6. Similarly, other predetermined characters of codes 616A-616C can be printed with a thermosensitive ink that disappears when exposed to temperatures above a second threshold value (e.g., 8° C.), as shown in rows 606A, 608A, 606B, 608B, 606C, and 608C of FIG. 6. It should be understand that the "_" symbol in any of codes 616A-616C of FIG. 6 represents one or more characters that have disappeared. In some examples, certain characters can appear and other characters can disappear when exposed to temperatures exceeding one or more temperature thresholds (e.g., for longer than one or more time thresholds). Because the possible character combinations of each of codes 616A-616C are predetermined, their significance 620 indicating whether and what type of breach has occurred is also predetermined, as illustrated in FIG. 6. This information (e.g., mappings 600A-600B) can be stored on a server (e.g., servers 102 and/or 104 as described above with reference to FIG. 1) in the form of a database, lookup table, or any other data structure that allows the server to look up the significance by a code combination.

Figure 7:
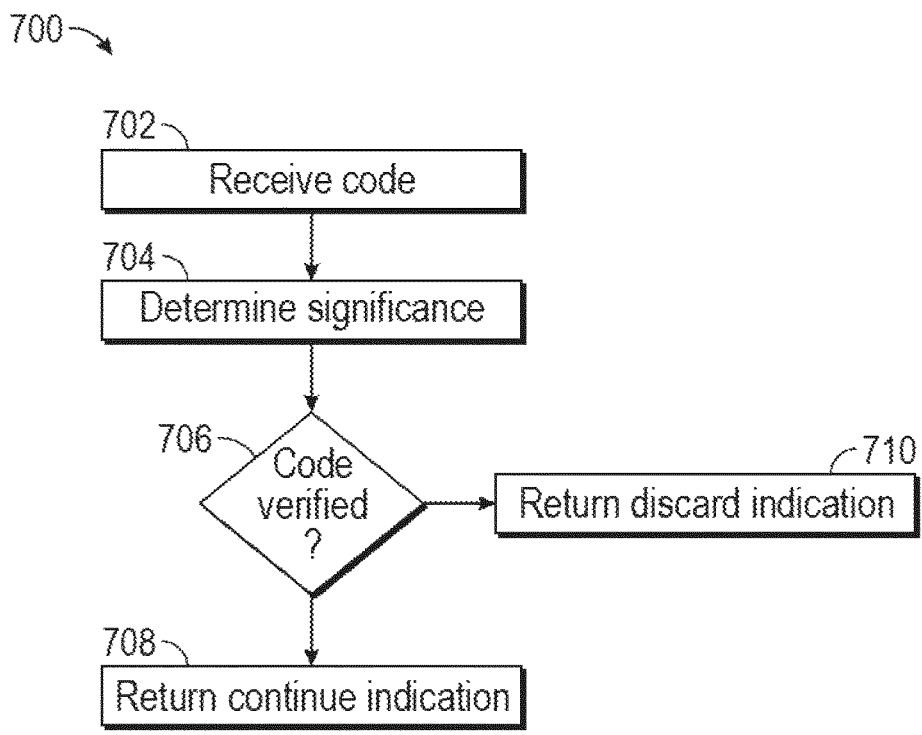
FIG. 7 illustrates a process for verifying a product according to examples of the disclosure.

FIG. 7 illustrates process 700 for verifying a product according to examples of the disclosure. In some examples, process 700 can be performed at a server (e.g., servers 102 and/or 104 as described above with reference to FIG. 1), a computer, a cell phone, and/or any device with a memory and processor.

At step 702, a code is received. This code can be label information (e.g., barcode and/or alphanumeric identifier printed on a label) scanned, read, captured, and/or transmitted by a scanner, cell phone, or computer (e.g., as described above with reference to FIGS. 1-6) corresponding to an actor or entity in a cold chain. These actors can include, but are not limited to, a manufacturer, delivery drivers/entities, distributors, vendors, and/or end-users. The scanned information can include an alphanumeric indicator printed on the label, an alphanumeric representation of the barcode(s) or pattern printed on the label, the date and/or time of the scan, an ID of the scanning party (e.g., employee ID, entity ID, scanner ID, MAC address), an image of the label, and/or any other information about the label, other labels, or the product. For simplicity, the received label information is herein referred to as the "code."

At step 704, the significance of the code is determined. For example, process 700 can perform a look up operation based on the received code (or code combination) to interpret the code's predetermined significance (e.g., as described above with reference to FIG. 6). For example, the code can correspond to a sequence of alphanumeric characters that correspond to the label being exposed to temperatures below a first threshold temperature, which would indicate a cold chain breach (e.g., as describe above with reference to FIG. 6).

At step 706, process 700 determines whether the code was verified. For example, process 700 will determine whether the significance of the code corresponds to a cold chain breach, a counterfeit product, a recalled product, and/or a label that has been tampered with. In some examples, process 700 can compare the code to another code (e.g., product SKU, portal ID) at step 706. If the code does not correspond to the other code, process 700 will determine that the product corresponding to the code is counterfeit or the label/code has been tampered with. In some examples, process 700 can classify the color or color pattern of the code (e.g., determine whether the color of the ink on the label changed because the label was exposed to temperatures beyond one or more temperature thresholds (e.g., as described above with reference to FIG. 5) at step 704. If the code is verified (e.g., no cold chain breach, no recall, no counterfeiting, and no tampering was detected), process 700 returns a continue indication at step 708. For example, process 700 can send a notification (e.g., an alert, phone call, text message, or any other instant messaging service) to the scanning actor (e.g., one or more scanner, cell phone, and/or computer associated with the actor) indicating that the code was verified. If the code is not verified (e.g., because a cold chain breach, a recall, tampering, and/or counterfeiting was detected), process 700 returns a discard indication at step 710. For example, process 700 can send a notification (e.g., an alert, phone call, text message, or any other instant messaging service) to the scanning actor (e.g., one or more of a scanner, cell phone, and/or computer associated with the actor) indicating that the code was not verified. In some examples, the notification can include instructions to discard the product, return the product, or test the product (e.g., to check the potency of the vaccine). In some examples, a notification (e.g., indicating whether the code was verified or note verified) is sent to some or all of the actors in the cold chain (e.g., the manufacturer, upstream actors, midstream actors, downstream actors, end user, etc.) at steps 708 and/or 710. In this way, the other cold chain actors can remain appraised of the status of a product along the cold chain. In some examples, process 700 logs (e.g., at server 102 and/or server 104 as described above with reference to FIG. 1) the code (e.g., the label information received at step 702), the significance of the code, and/or whether the code was verified at steps 708 and/or 710. In this way, the logs of a supply can be analyzed (e.g., to determine where a breach occurred, where a label was tampered with, etc.) and/or trends along a cold chain (e.g., statistics on actors with frequent breaches).

Figure 8:
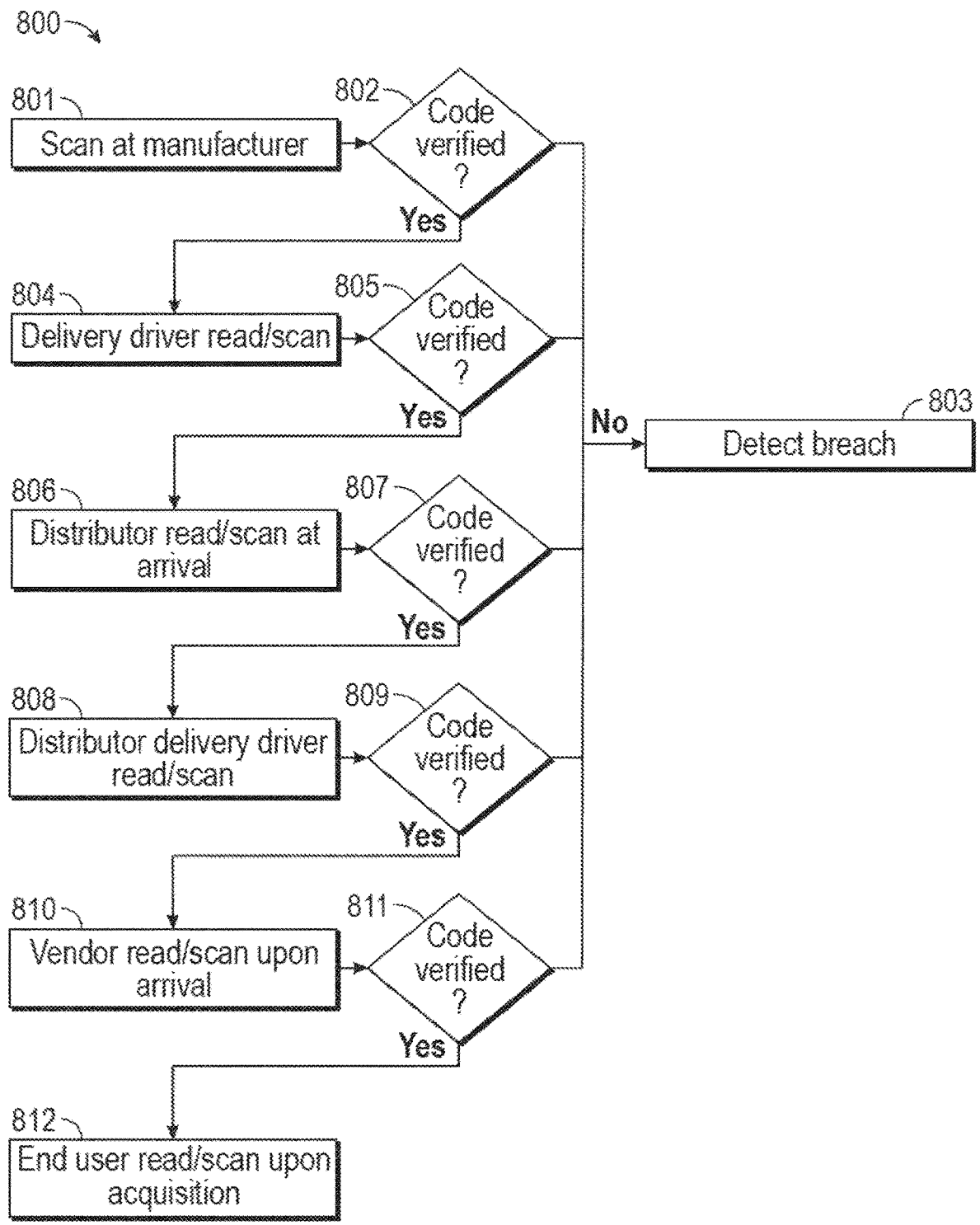
FIG. 8 illustrates a process flow for verifying a product along an exemplary cold chain according to examples of the disclosure.

FIG. 8 illustrates a process flow 800 for verifying a product along an exemplary cold chain according to examples of the disclosure. It should be understood that additional, fewer, and/or different cold chain actors can be used.

At step 801, the label on a product can be scanned (e.g., as described above with reference to FIGS. 1-6) by the manufacturer. In some examples, the one or more labels with a barcode, an alphanumeric identifier, and/or any other pattern is printed and affixed to the product at step 801 (e.g., as described above with reference to FIGS. 2-6). In some examples, the barcode (or any other pattern), alphanumeric identifier, and product information is registered with a remote server (e.g., servers 102 and/or 104 as described above with reference to FIG. 1).

The scanned information from step 801 is communicated to the server and verified by the server at step 802 (e.g., as described above with reference to FIG. 7). If the code is not verified, a breach is detected and optionally logged at step 803 (e.g., as described above with reference to FIG. 7). In some examples, the product is discarded at step 803. In some examples, process 800 communicates the breach to one or more actors of a cold chain including the scanning party (e.g., the manufacturer) at step 803. If the code is verified at step 802 (e.g., as described above with reference to FIG. 7), the scanned information is optionally logged (e.g., at server 102 and/or server 104 as described above with reference to FIGS. 1 and 7) and the product continues along the cold chain.

At step 804, the label is scanned/read by the delivery driver/entity (e.g., as described above with reference to FIGS. 1-4). The scanned information from step 804 is communicated to the server and verified by the server at step 805 (e.g., as described above with reference to FIG. 7). If the code is not verified, a breach is detected and optionally logged at step 803 (e.g., as described above with reference to FIG. 7). In some examples, the product is discarded at step 803. In some examples, process 800 communicates the breach to one or more actors of a cold chain including the scanning party (e.g., the delivery entity) at step 803. If the code is verified at step 805 (e.g., as described above with reference to FIG. 7), the scanned information is optionally logged (e.g., at server 102 and/or server 104 as described above with reference to FIGS. 1 and 7) and the product continues along the cold chain.

At step 806, the label is scanned/read by the distributor (e.g., as described above with reference to FIGS. 1-4). The scanned information from step 806 is communicated to the server and verified by the server at step 807 (e.g., as described above with reference to FIG. 7). If the code is not verified, a breach is detected and optionally logged at step 803 (e.g., as described above with reference to FIG. 7). In some examples, the product is discarded at step 803. In some examples, process 800 communicates the breach to one or more actors of a cold chain including the scanning party (e.g., the distributor) at step 803. If the code is verified at step 807 (e.g., as described above with reference to FIG. 7), the scanned information is optionally logged (e.g., at server 102 and/or server 104 as described above with reference to FIGS. 1 and 7) and the product continues along the cold chain.

At step 808, the label is scanned/read by the distributor driver (e.g., as described above with reference to FIGS. 1-4). The scanned information from step 808 is communicated to the server and verified by the server at step 809 (e.g., as described above with reference to FIG. 7). If the code is not verified, a breach is detected and optionally logged at step 803 (e.g., as described above with reference to FIG. 7). In some examples, the product is discarded at step 803. In some examples, process 800 communicates the breach to one or more actors of a cold chain including the scanning party (e.g., the distributor driver) at step 803. If the code is verified at step 809 (e.g., as described above with reference to FIG. 7), the scanned information is optionally logged (e.g., at server 102 and/or server 104 as described above with reference to FIGS. 1 and 7) and the product continues along the cold chain.

At step 810, the label is scanned/read by the vendor (e.g., as described above with reference to FIGS. 1-4). The scanned information from step 810 is communicated to the server and verified by the server at step 811 (e.g., as described above with reference to FIG. 7). If the code is not verified, a breach is detected and optionally logged at step 803 (e.g., as described above with reference to FIG. 7). In some examples, the product is discarded at step 803. In some examples, process 800 communicates the breach to one or more actors of a cold chain including the scanning party (e.g., the vendor) at step 803. If the code is verified at step 811 (e.g., as described above with reference to FIG. 7), the scanned information is optionally logged (e.g., at server 102 and/or server 104 as described above with reference to FIGS. 1 and 7) and the product continues along the cold chain.

At step 812, the label is scanned/read by an end user (e.g., as described above with reference to FIGS. 1-4). The scanned information from step 812 is communicated to the server and verified by the server at step 811 (e.g., as described above with reference to FIG. 7). If the code is not verified, a breach is detected and optionally logged at step 803 (e.g., as described above with reference to FIG. 7). In some examples, the product is discarded at step 803. In some examples, process 800 communicates the breach to one or more actors of a cold chain including the scanning party (e.g., the end user) at step 803. If the code is verified at step 811 (e.g., as described above with reference to FIG. 7), the scanned information is optionally logged (e.g., at server 102 and/or server 104 as described above with reference to FIGS. 1 and 7) and the product can be used by the end user.

Thus, the examples of the disclosure provide various ways to implement cold chain quality control and security measures using thermosensitive inks.

Therefore, according to the above, some examples of the disclosure are directed to a method for verifying a product in a cold chain comprising: receiving label information, wherein the label information includes information about a code printed on a label with thermosensitive ink and conventional ink; determining the significance of the code; in accordance with a determination that the significance of the code is verified, returning a continue indication; and in accordance with a determination that the significance of the code is not verified, returning a discard indication. Additionally or alternatively to one or more of the examples disclosed above, in some examples, determining the significance of the code comprises performing a look up operation of the significance based on the code. Additionally or alternatively to one or more of the examples disclosed above, in some examples, the determination that the significance of the code is verified includes a determination that the code corresponds to a first alphanumeric code combination that includes every character printed on the label with the thermosensitive ink and the conventional ink. Additionally or alternatively to one or more of the examples disclosed above, in some examples, the determination that the significance of the code is not verified includes a determination that the code corresponds to a second alphanumeric code combination that indicates that the product was exposed to temperatures above a first threshold temperature. Additionally or alternatively to one or more of the examples disclosed above, in some examples the determination that the significance of the code is not verified includes a determination that the code corresponds to a second alphanumeric code combination that indicates that the product was exposed to temperatures below a second threshold temperature. Additionally or alternatively to one or more of the examples disclosed above, in some examples, the determination that the significance of the code is not verified includes a determination that the code corresponds to a second alphanumeric code combination that indicates that the product was exposed to temperatures above a first threshold temperature and that the product was exposed to temperatures below a second threshold temperature, lower than the first threshold temperature. Additionally or alternatively to one or more of the examples disclosed above, in some examples, the first alphanumeric code includes one or more characters than the second alphanumeric code and the one or more characters were printed with a first thermosensitive ink that disappears when exposed to temperatures above the first threshold temperature. Additionally or alternatively to one or more of the examples disclosed above, in some examples, the first alphanumeric code includes one or more characters than the second alphanumeric code and the one or more characters were printed with a second thermosensitive ink that disappears when exposed to temperatures below the second threshold temperature. Additionally or alternatively to one or more of the examples disclosed above, in some examples, the code is a barcode with a first portion printed on the label with a first thermosensitive ink that disappears when exposed to temperatures above a first threshold temperature and a second portion printed on the label with the conventional ink; the determination that the significance of the code is verified includes a determination that the label information includes the first portion of the barcode; and the determination that the significance of the code is not verified includes a determination that the label information does not include the first portion of the barcode. Additionally or alternatively to one or more of the examples disclosed above, in some examples, the barcode includes a third portion printed on the label with a second thermosensitive ink that disappears when exposed to temperatures below a second threshold temperature and a second portion printed on the label with the conventional ink; the determination that the significance of the code is verified includes a determination that the label information includes the third portion of the barcode; and the determination that the significance of the code is not verified includes a determination that the label information does not include the third portion of the barcode. Additionally or alternatively to one or more of the examples disclosed above, in some examples, the code is a pattern with a first portion printed on the label with a first thermosensitive ink that changes from a first color to a second color when exposed to temperatures above a first threshold temperature and a second portion printed on the label with the conventional ink; the determination that the significance of the code is verified includes a determination that the label information includes information about the first portion of the pattern being the first color; and the determination that the significance of the code is not verified includes a determination that the label information includes information about the first portion of the pattern being the second color. Additionally or alternatively to one or more of the examples disclosed above, in some examples, the pattern includes a third portion printed on the label with a second thermosensitive ink that changes from a third color to a fourth color when exposed to temperatures below a second threshold temperature and a second portion printed on the label with the conventional ink; the determination that the significance of the code is verified includes a determination that the label information includes information about the third portion of the pattern being the third color; and the determination that the significance of the code is not verified includes a determination that the label information includes information about the third portion of the pattern being the fourth color. Additionally or alternatively to one or more of the examples disclosed above, in some examples, the first color and the third color are different. Additionally or alternatively to one or more of the examples disclosed above, in some examples, the second color and the fourth color are different. Additionally or alternatively to one or more of the examples disclosed above, in some examples, the code was received via a text message.

Some examples of the disclosure are directed to a system for verifying a cold chain comprising: a product with a label including a code comprising a first portion printed with thermosensitive ink and a second portion printed with conventional ink, wherein the thermosensitive ink disappears when exposed to temperatures above a first threshold temperature; one or more client devices for scanning the code at each entity of the cold chain; a server configured to log label information scanned by each of the one or more client devices and to verify the code at each scan, wherein the server verifies the code when the label information includes the first portion of the code and detects a breach in the cold chain when the label information does not include the first portion of the code. Additionally or alternatively to one or more of the examples disclosed above, in some examples, the server is further configured to instruct a first entity of the cold chain that scanned the label information to discard the product when the breach is detected. Additionally or alternatively to one or more of the examples disclosed above, in some examples, the server is further configured to notify each entity of the cold chain when the breach is detected. Additionally or alternatively to one or more of the examples disclosed above, in some examples, the server is further configured to provide access to the logged label information to each entity of the cold chain.

Some examples of the disclosure are directed to a non-transitory computer readable storage medium storing one or more programs, the one or more programs comprising instructions, which when executed by one or more processors of an electronic device, cause the electronic device to: receive label information, wherein the label information includes information about a code printed on a label with thermosensitive ink and conventional ink; determine the significance of the code; in accordance with a determination that the significance of the code is verified, return a continue indication; and in accordance with a determination that the significance of the code is not verified, return a discard indication.

Some examples of the disclosure are directed to a cold chain security system with encrypted thermosensitive labels linked to an online traceability portal comprising of a plurality of human and machine readable labels affixed to cold chain item packages and having a multitude of ink properties coupled with an online software system providing cold chain validation and product lifecycle traceability. Additionally or alternatively to one or more of the examples disclosed above, in some examples, providing a means to preserve the cold chain of a perishable item using human and machine readable printed codes such as, but not limited to alphanumerical identifiers and bar codes that are affixed to a product during its genesis. Additionally or alternatively to one or more of the examples disclosed above, in some examples, providing a means to visually interpret signs of an environmental cold chain breach through an examination of representative colors as an instantaneous redundancy check. Additionally or alternatively to one or more of the examples disclosed above, in some examples, providing a means of detecting label code tampering and counterfeiting by incorporating a myriad of symbolic signatures into the aforementioned human and machine readable codes. Additionally or alternatively to one or more of the examples disclosed above, in some examples, providing additional label code tampering security through manual means by pairing a plurality of said signatures with a plurality of the aforementioned human and machine readable codes. Additionally or alternatively to one or more of the examples disclosed above, in some examples, providing comprehensive traceability access throughout the entire cold chain amongst all stakeholders, including manufacturers, distributors, merchants, as well as end users, etc.

Some examples of the disclosure are directed to a system for a verifying a cold chain comprising: a product with a label including a portion marked with a smectic or nematic liquid crystal encrustation in which macromolecule complexes are interlocked as part of the polymer structure such that a chain polymerisation and depolymerisation effects triggered by an external temperature gradient according to a statistical distribution, known in advance by virtue of a large data set comprised of images of a wide array of phase-transition shifts and the patterns generated thereof by techniques generally called "unsupervised learning" within the field of machine learning, correspond to particular measurement indicia for thermosensitivity. The aforesaid phase shift transitions may consists of chromatic signature evolutions of a statistically deterministic kind as well as other parameters such as hue, saturation, surface turbulence or smoothness or other variations of surface planar dynamics on the product packaging, whether or not such shifts are mapped to inter-pole dynamics or to the orientational movements of actual free-ranging elements in the composition of the liquid crystal crust. An alternative implementation would be to overlay a 2-dimensional barcode, such as the type commonly referred to as a Data Matrix, with the encrustation and to generate the dataset of patterns aforementioned as a repository of phased imagery whereby the cumulative "damage" caused to the barcode corresponds to the thermoregulative function of the composite polymer as a means of establishing a cumulative temperature exposure of the underlying product over a discernible period of time. Using a scanning device connected to a model of interpretation constructed by means of an algorithmic interpretation of the dataset established through the segmentation of the divers features of the phased imagery collected through the recording of the aforementioned transitional shifts in the liquid crystal mini-display or a combination of same and the 2-dimensional barcode, a cumulative temperature threshold index and record can be established with each momentary scan.

Some examples of the disclosure are directed to a method of establishing a reference dataset and database of thermo-sensitive smectic and nematic liquid crystal structures phase transitions and the phase transitions of the composites of such structures with ink-embedded 2-dimensional barcodes or other symbologies for the purpose of unsupervised learning based segmentation of phased imagery in order to extract distinguishing features of specific formulations of these structures into models of interpretation wherewith imaging algorithms can simultaneously, by means of electronic scanning and reading devices, translate emergent patterns into cumulative temperature readings against an algorithmic thermotropic index. Additionally, such datasets or databases might be refined for higher levels of accuracy by means of enhanced 3-dimensional modelling in microgravity chambers such as the apparatus and contraptions accessible through the international space station. The enhanced 3-dimensional modelling may impact both the mechanics of material flow within the polymer macrostructures culminating in the formation of unique signatures impossible to assemble with similar processes in Earth/terrestrial-based laboratories as well as the spectral range of collected phase shift imagery constituting the reference dataset on which the aforementioned unsupervised machine learning algorithm can be set to "train" for the ultimate goal of constructing the benchmarking instrumentation required for establishing the cumulative threshold indicators constituting the thermotropic index for the label logging activity.

Although examples have been fully described with reference to the accompanying drawings, it is to be noted that various changes and modifications will become apparent to those skilled in the art. Such changes and modifications are to be understood as being included within the scope of examples of this disclosure as defined by the appended claims.

The invention claimed is:

1. A method for verifying a product, comprising:
  receiving label information, wherein the label information comprises a value of a code printed on a label with thermosensitive ink;
  determining a significance of the code, wherein the significance of the code is encrypted and stored on a server;
  in accordance with a determination that the significance of the code is verified, transmitting a continue indication; and
  in accordance with a determination that the significance of the code is not verified, transmitting a discard indication, wherein:
    a portion of the code corresponds to a portion of the value of the code,
    the value is a first value if the portion of the code has not disappeared, and a value of the portion of the first value corresponds to the portion not disappearing, and
    the value is a second value if the portion of the code disappeared, and a value of the portion of the second value corresponds to the portion of the code disappearing.

2. The method of claim 1, wherein the thermosensitive ink comprises one or more thermo-receptors.

3. The method of claim 1, wherein:
  the product is a pharmaceutical product, and
  the label information further comprises information about the pharmaceutical product.

4. The method of claim 1, wherein the label information is received via a text-based communication protocol.

5. The method of claim 1, wherein:
  transmitting the continue indication comprises transmitting the continue indication via a text-based communication protocol, and
  transmitting the discard indication comprises transmitting the discard indication via the text-based communication protocol.

6. The method of claim 1, wherein the label information is received from a device receiving the code as an input.

7. The method of claim 1, further comprising receiving an update associated with the product, wherein the determination whether the significance is verified is based on the received update.

8. The method of claim 1, further comprising:
  receiving second label information comprising a second code;
  determining whether a significance of the second code is stored on the server; and
  in accordance with a determination that the significance of the second code is not stored on the server, transmitting a second discard indication.

9. The method of claim 1, further comprising determining whether the value of the code is the first value or the second value, wherein:
  the determination that the significance of the code is verified comprises determining that the value of the code is the first value, and
  the determination that the significance of the code is not verified comprises determining that the value of the code is the second value.

10. The method of claim 1, wherein the server is configured to receive an update associated with the product, wherein the determination whether the significance is verified is based on the received update.

11. A system for verifying a product, comprising:
a label associated with the product, the label comprising label information, wherein the label information comprises a value of a code printed with thermosensitive ink, wherein:
   a portion of the code corresponds to a portion of a value of the code,
   the value is a first value if the portion of the code has not disappeared, and a value of the portion of the first value corresponds to the portion not disappearing, and
   the value is a second value if the portion of the code disappeared, and a value of the portion of the second value corresponds to the portion of the code disappearing; and
a server configured to:
   encrypt a significance of the code associated with the verification of the product;
   store the significance of the code;
   receive label information comprising the value of the code;
   determine whether the significance of the code is verified based on the received value;
   in accordance with a determination that the significance of the code is verified, transmit a continue indication; and
   in accordance with a determination that the significance of the code is not verified, transmit a discard indication.

12. The system of claim 11, wherein the thermosensitive ink comprises one or more thermo-receptors.

13. The system of claim 11, wherein:
the product is a pharmaceutical product, and
the label information further comprises information about the pharmaceutical product.

14. The method of system of claim 11, wherein the label information is received via a text-based communication protocol.

15. The method of system of claim 11, wherein the server is configured to:
transmit the continue indication via a text-based communication protocol, and
transmit the discard indication via the text-based communication protocol.

16. The system of claim 11, wherein the label information is received from a device receiving the code as an input.

17. The system of claim 11, wherein the server is configured to:
receive second label information comprising a second code;
determine whether a significance of the second code is stored on the server; and
in accordance with a determination that the significance of the second code is not stored on the server, transmit a second discard indication.

18. The system of claim 11, wherein the server is configured to determine whether the value of the code is the first value or the second value, wherein:
the determination that the significance of the code is verified comprises determining that the value of the code is the first value, and
the determination that the significance of the code is not verified comprises determining that the value of the code is the second value.

19. A label for verifying a product, wherein:
the label comprises label information,
the label information comprises a value of a code printed on a label with thermosensitive ink,
the label information is configured to be transmitted to a server,
a significance of the code is encrypted and stored on the server, the significance of the code associated with a continue indication or a discard indication,
a portion of the code corresponds to a portion of a value of the code,
the value is a first value if the portion of the code has not disappeared, and a value of the portion of the first value corresponds to the portion not disappearing, and
the value is a second value if the portion of the code disappeared, and a value of the portion of the second value corresponds to the portion of the code disappearing.

20. The label of claim 19, wherein the thermosensitive ink comprises one or more thermo-receptors.

* * * * *